(12) United States Patent
Shinagawa

(10) Patent No.: US 6,519,527 B2
(45) Date of Patent: Feb. 11, 2003

(54) NAVIGATION ASSISTING SYSTEM, FLIGHT-ROUTE CALCULATING METHOD, AND NAVIGATION ASSISTING METHOD

(75) Inventor: Yuuichi Shinagawa, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/953,282

(22) Filed: Sep. 17, 2001

(65) Prior Publication Data

US 2002/0161514 A1 Oct. 31, 2002

(30) Foreign Application Priority Data

Mar. 19, 2001 (JP) ........................................ 2001-078991
Mar. 19, 2001 (JP) ........................................ 2001-079458

(51) Int. Cl.[7] ............................................. G01C 21/20
(52) U.S. Cl. ............................. 701/209; 701/3; 701/202
(58) Field of Search ........................... 701/3, 202, 120, 701/201, 206, 209, 211, 203; 244/175; 342/357.08, 357.13; 340/947, 979

(56) References Cited

U.S. PATENT DOCUMENTS

| | | | |
|---|---|---|---|
| 5,408,413 A | * | 4/1995 | Gonser et al. ............... 701/204 |
| 5,842,142 A | * | 11/1998 | Murray et al. ................. 701/16 |
| 6,085,147 A | * | 7/2000 | Myers ......................... 701/209 |
| 6,134,500 A | * | 10/2000 | Tang et al. .................. 701/202 |

OTHER PUBLICATIONS

Bitterman et al., "Finder, A System Providing Complex Decision Support for Commercial Transport Replanning Operations", IEEE Aerospace Electronics Systems Magazine, vol. 9 Issue 3, Mar. 1994, pp. 12–19.*

* cited by examiner

*Primary Examiner*—Michael J. Zanelli
*Assistant Examiner*—Eric M Gibson
(74) *Attorney, Agent, or Firm*—Oblon, Spivak, McClelland, Maier & Neustadt, P.C.

(57) ABSTRACT

The present invention stores data of the nearest airport where an airplane can take off and land as well as database of an ETOPS-applied time related to this airplane beforehand. when a flight route is set, this ETOPS-applied time is read out. An area having a radius r calculated on the basis of the ETOPS-applied time is defined to be a flight-permitted area. With this, if a desired route entered by the operator is outside this area, an operating port calculates a flight route that can be contained in the flight-permitted area throughout the total flight.

26 Claims, 7 Drawing Sheets

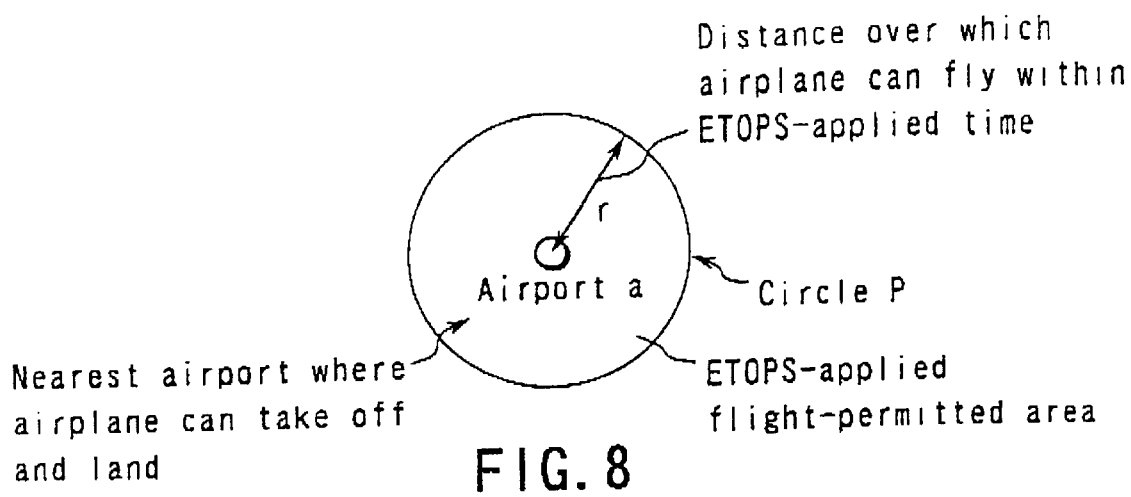
FIG. 8
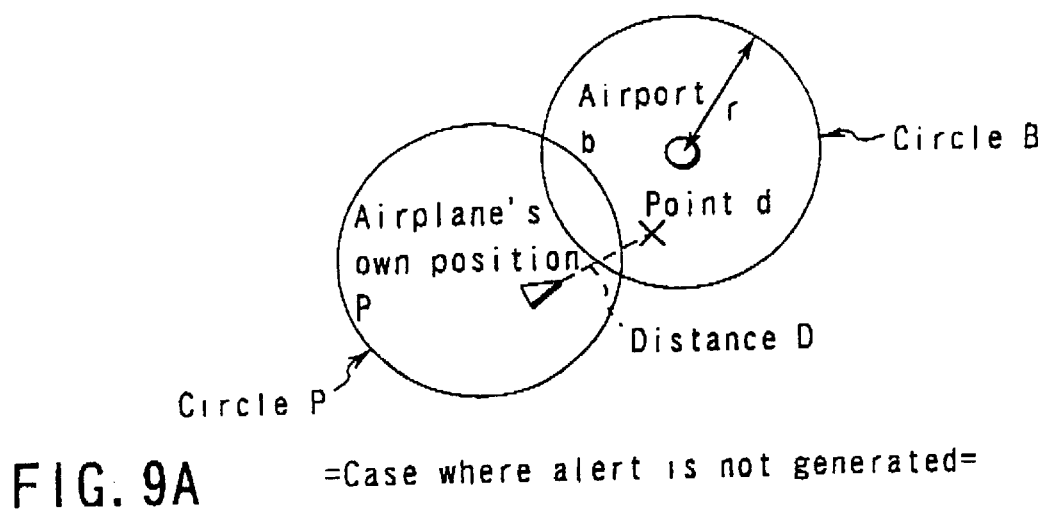
FIG. 9A  =Case where alert is not generated=
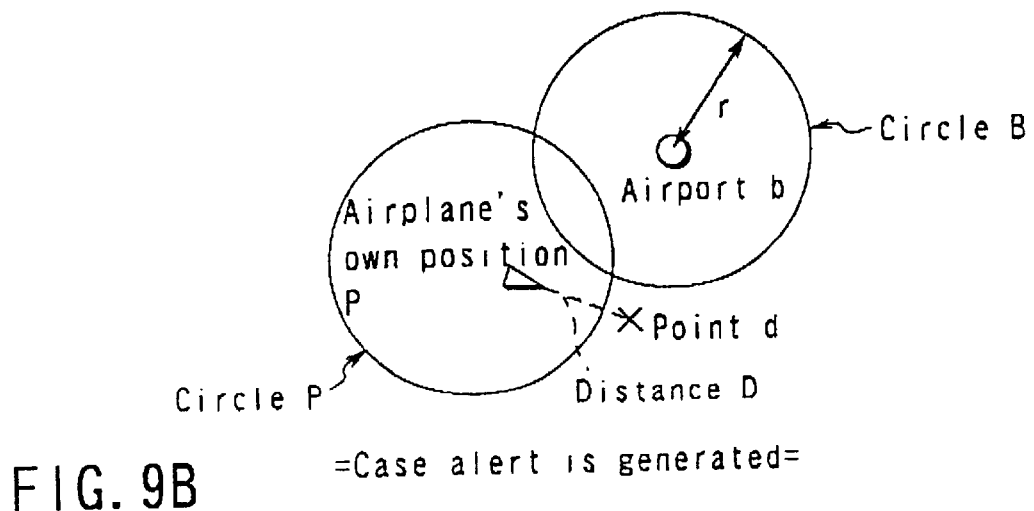
FIG. 9B  =Case alert is generated=

NAVIGATION ASSISTING SYSTEM, FLIGHT-ROUTE CALCULATING METHOD, AND NAVIGATION ASSISTING METHOD

CROSS-REFERENCE TO RELATED APPLICATIONS

This application is based upon and claims the benefit of priority from the prior Japanese Patent Applications No. 2001-078991, filed Mar. 19, 2001; and No. 2001-079458, filed Mar. 19, 2001, the entire contents of both of which are incorporated herein by reference.

BACKGROUND OF THE INVENTION

1. Field of the Invention

The present invention relates to a navigation assisting system, a flight-route calculating method, and a navigation assisting method carried on an airplane which flies as restricted by the ETOPS (Extended Twin Operations).

2. Description of the Related Art

If a twin-engine airplane (airplane equipped with two engines) develops a problem in one of its two engines in flight, it must use the remaining engine to fly to the nearest airport to land. Accordingly, in many cases, twin-engine airplanes are subject to such a restriction that they must fly to be always within 90 minutes of an airport (60 minutes in the USA). This restriction is commonly known to the public as an international rule, based on the international treaty of the ICAO (International Civil Aviation Organization).

On the other hand, ETOPS is provided as a rule for permitting an airplane to prolong its flight time to fly to an airport if the reliability of its engines satisfies certain standards and its operator (e.g., aviation company) satisfies certain safety standards. For example, a state where an arrival time to the nearest airport where take-off and landing are possible is increased to 120 minutes is referred to as "120-minute ETOPS". By adopting this rule, the degree of freedom in the operation of airplanes is enhanced. Moreover, the operators motivation hence the safety of the aircraft can be improved.

Thus, twin-engine airplanes are subject to particular conditions. Because of these conditions, twin-engine airplanes cannot always fly along a direct route from a departure place to a destination. That is, a flight route of a twin-engine airplane is determined so that its arrival time to an airport where it can take off and land, which lies en-route between the point of departure and destination may come within an ETOPS-applied time (that is, 90 minutes, 120 minutes, etc.).

Some of the navigation assisting systems referred to as FMS (Flight Management System) which have been developed recently have a function to automatically calculate a flight route. This function is utilized when a flight plan is prepared before take-off. However, there is no known system that can calculate a flight route taking into account the ETOPS environment.

Furthermore, recent FMSs have a function to warn the pilot if the airplane is about to leave its designated flight-route band when flying. This function is useful when the airplane must deviate from its originally planned flight-path because of bad weather.

This type of existing system, however, does not take into account the ETOPS flight-permitted area. That is, this type of system does not give warning even if the airplane is about to leave the ETOPS flight-permitted area.

Therefore, if the airplane must deviate from its originally-planned flight-path, the pilot must first confirm, by studying a paper map, etc., whether its current flight route satisfies ETOPS environment. It may inflict a heavy burden on the pilot, thus degrade the safety of the flight.

BRIEF SUMMARY OF THE INVENTION

It is an object of the present invention to provide a navigation assisting system and a flight-route calculating method that can calculate a flight route taking into account the ETOPS environment in a flight area.

It is another object of the present invention to provide a navigation assisting system and method which can give a warning, taking into account the ETOPS environment, to mitigate the burden on the pilot, thus contributing to the safety of the flight.

One aspect of the navigation assisting system according to the present invention carried on an airplane includes a storing means for storing a database in which position information of a plurality of airports and information of permission/refusal of take-off/landing of the airplane at the airports correspond to the plurality of airports, respectively, and the regulated time set for the airplane, and an operating means for operating a flight route from which the airplane can fly to an airport where it can take off and land within the regulated time in a flight-permitted area of the airplane.

Such means being thus provided, supposing the airplane to be, for example, a twin-engine one, the operating means calculates such a flight route within the flight-permitted area that satisfies the restriction placed on the airplane that prohibits flying outside an allowed area, to an airport where it can take off and land. Particularly in a case where the regulated time is increased, using ETOPS, it calculates a flight-permitted area based on the thus increased regulated time.

Thus, a flight route taking ETOPS into account can be calculated by the operating means. This eliminates the need for the pilot to calculate the flight route taking into account the ETOPS conditions. This in turn can mitigate the labor of the pilot and also contribute to safety in operations of the aircraft.

Another aspect of the navigation assisting system according to the present invention carried on an airplane includes a storing means for storing a database in which position information of a plurality of airports and information of permission/refusal of take-off/landing of the airplane at the airports correspond to the plurality of airports, respectively, and the regulated time set for the airplane, and an operating means for specifying as a flight-permitted area of the airplane the inside of a circle having as its radius a distance over which the airplane can arrive within the regulated time also having as its center an airport that the airplane can reach to thereby search the database for the nearest airport where the airplane can take off and land, thus deciding whether the airplane has left the flight-permitted area based on position information of the airplane relative to its flight-permitted area for that nearest airport.

Such means being thus provided, supposing the airplane to be, for example, a twin-engine one, the operating means decides whether the airplane is in a flight-permitted area which satisfies such a restriction that permits flight only in an area from which the airplane can fly to an airport where it can take off and land. If it decides that the airplane has left the flight-permitted area, a message, for example, "warning" is indicated.

Furthermore, even when the airplane remains in the flight-permitted area, if a predetermined point in a traveling direction of the airplane is out of the flight-permitted area, the operating means comes up with a decision that the airplane is in danger of leaving the flight-permitted area. In such a case, a message, for example, "caution", different from that of the above-mentioned case, is indicated.

In particular, if the regulated time can be prolonged by application of ETOPS, it calculates a flight-permitted area based on this increased regulated time. Moreover, correspondingly, it decides whether the airplane has deviated from the flight-permitted area.

Accordingly, the operating means automatically decides if the airplane has left the ETOPS-flight-permitted area. If it has left it, a message to that effect is given on the display, thus warning the operator. This exempts the operator from the labor of referring to a paper map, thus contributing to safety in operations of the aircraft.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a conceptual diagram for showing an ETOPS-applied flight-permitted area in the embodiment of the present invention;

FIGS. 9A and 9B are schematic diagrams for showing how a warning is given in the embodiment of the present invention.

DETAILED DESCRIPTION OF THE INVENTION

The following will describe embodiments of the present invention with reference to the drawings in detail.

Figure 1:
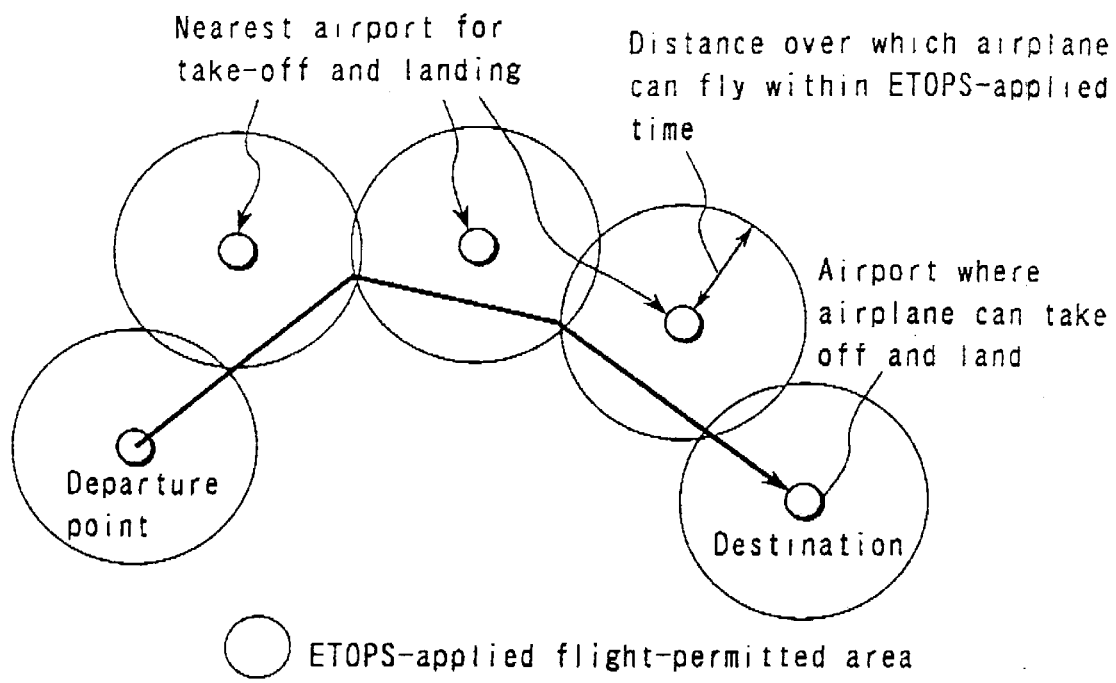
FIG. 1 is a conceptual diagram for showing a route which an airplane subject to an ETOPS limitation is due to fly along.

FIG. 1 is a conceptual diagram for showing a flight route which an airplane subject to an ETOPS limitation is due to fly along. As shown in FIG. 1, the airplane subject to the ETOPS limitation in most cases cannot fly along the shortest route from its departure point to its destination. The airplane subject to the ETOPS limitation must fly within a circle having as its radius a distance over which the airplane can fly to an airport where it can take off and land along the shortest route.

Figure 2:
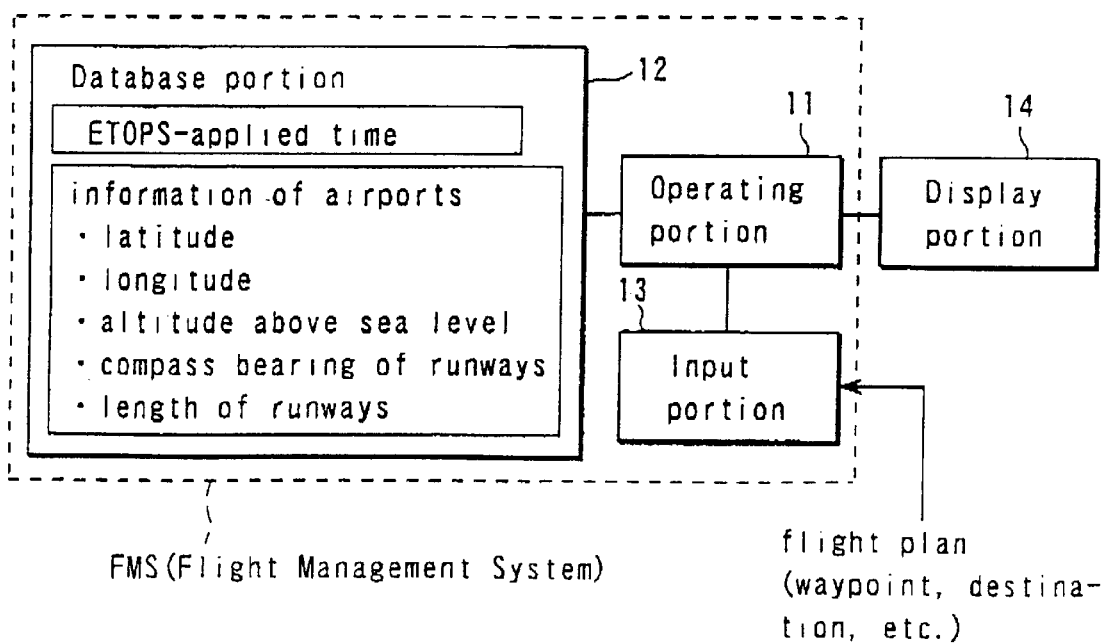
FIG. 2 is a functional block diagram for showing a configuration of a navigation assisting system related to an embodiment of the present invention.

FIG. 2 is a functional block diagram for showing a configuration of a navigation assisting system related to this embodiment. This system is carried on a twin-engine airplane (hereinafter referred to as the present plane), including an operating portion 11, a database portion 12, an input portion 13, and a display portion 14.

The operating portion 11 automatically sets a flight route of the present plane and also selects the nearest airport where it can take off and land. The database portion 12 stores data of the nearest airport where the present plane can take off and land as well as the operation time, as a database, of ETOPS related to the present plane. The input portion 13 used to input a flight route (via points such as a waypoint or destination) desired for the present plane. The display portion 14 is used to display various kinds of information obtained by the operating portion 11.

Of these portions, the operating portion 11, and the database portion 12 are often integrated into part of an FMS unit in recent so-called high-tech airliners.

The database portion 12 is implemented as a memory means such as a semiconductor memory, storing a database of information of a plurality of airports including positional information such as their latitude, longitude, altitude above sea level as well as information of compass bearing and length of their runways. This kind of database is commercially available to aviation companies and updated periodically.

Figure 3:
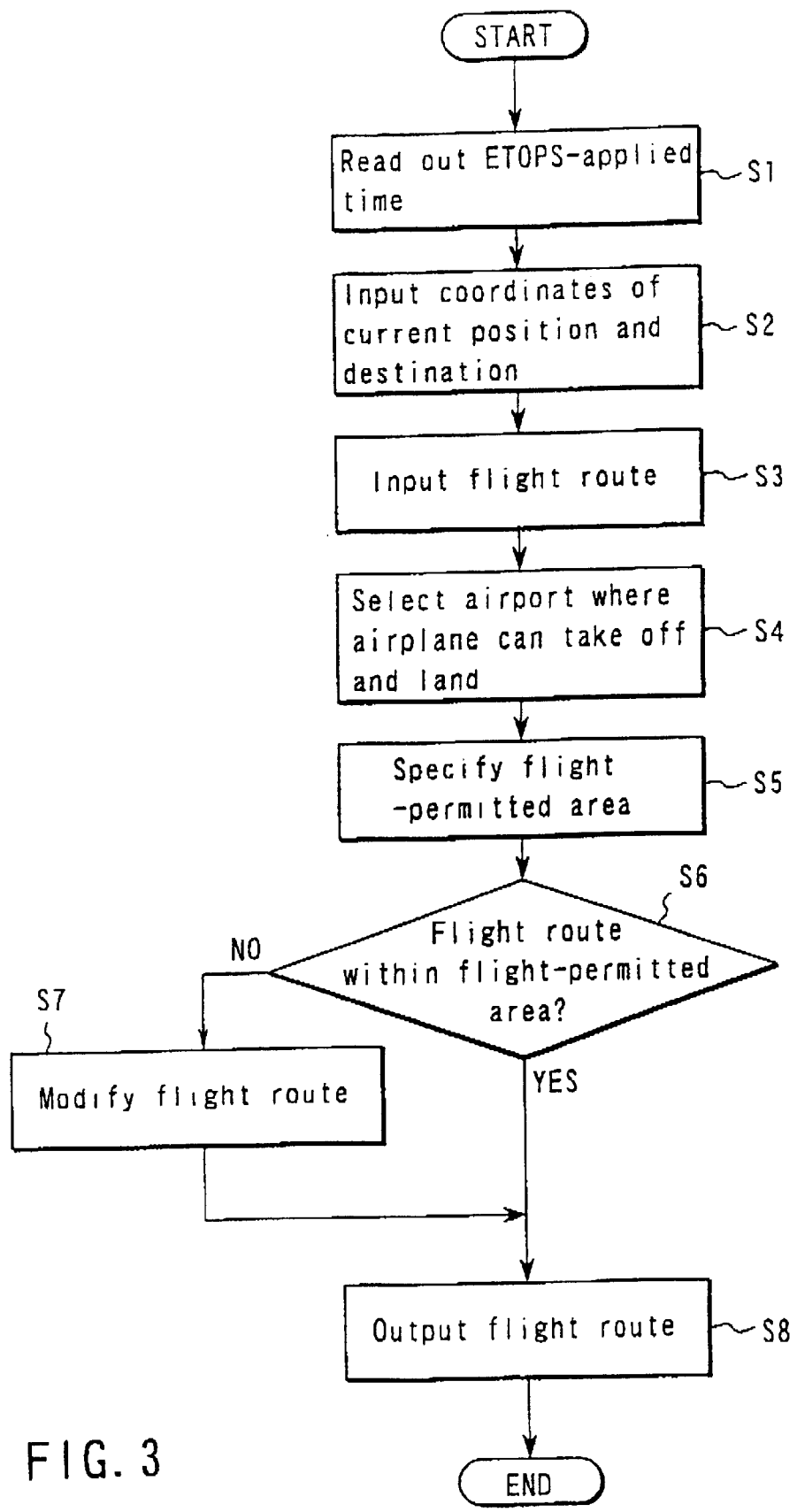
FIG. 3 is a flowchart for showing operations of the navigation assisting system of FIG. 2.

The following will describe the operations in the above-mentioned configuration with reference to FIG. 3. FIG. 3 is a flowchart for showing the operations of a navigation assisting system having the above-mentioned configuration. At step S1 of FIG. 3, first an ETOPS-applied time for the present plane is read out from the database portion 12. At step S2, the operator such as an pilot of the present plane enters at the input portion 13 the current position coordinates (x0, y0) and destination coordinates (xk, yk). As the current position coordinates, the coordinates of a departure position of the present plane may be entered. At the next step S3, the operator enters a flight route defined by P=f(x, y). Specifically, by giving the coordinates of a waypoint or a destination, the operators desired flight route is entered.

Figure 4:
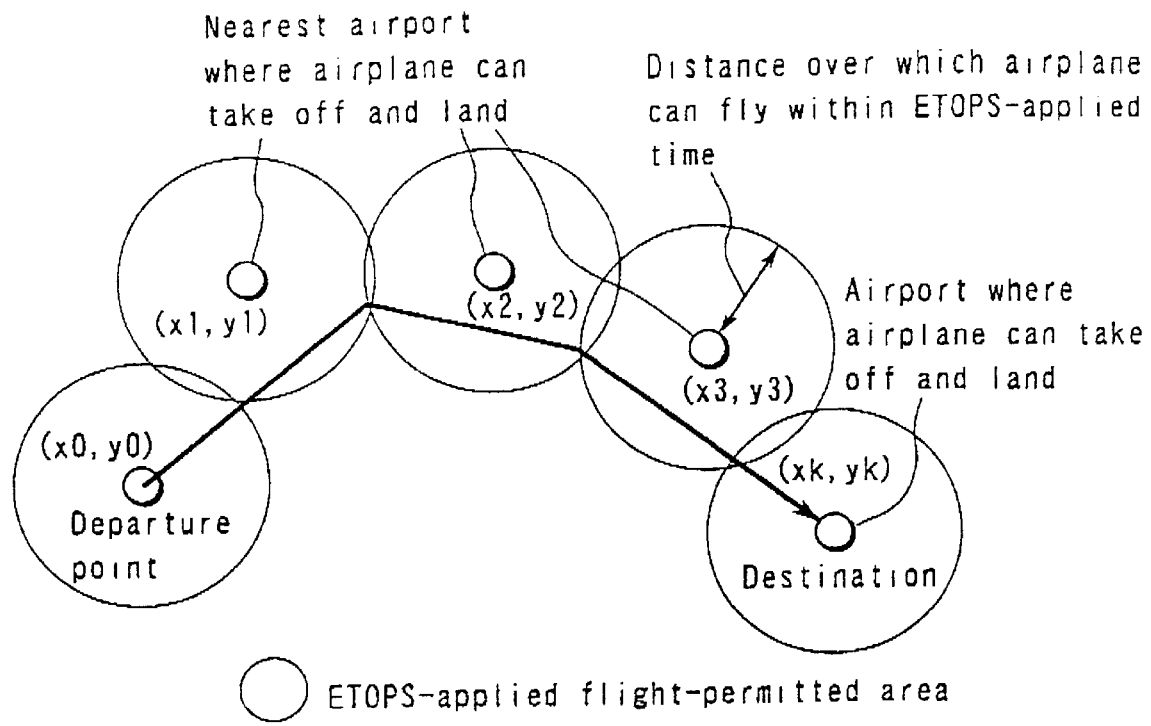
FIG. 4 is a schematic diagram for showing a definition of coordinates in the embodiment of the present invention.

As shown in FIG. 4, this embodiment, for example, defines coordinates of the departure point to be (x0, y0), coordinates of the destination to be (xk, yk), coordinates of somewhere along a route therebetween to be (x1, y1), (x2, y2), . . .

When these steps are thus completed, at step S4 the operating portion 11 selects an airport where the present plane can take off and land along a desired flight route taking into account a runway length etc, based on airport data read out from the database portion 12. At step S5, the operating portion 11 calculates an area from which the present plane can fly to the airport based on an ETOPS-applied time read out at step S1. Here, supposing a distance over which the present plane can fly within the ETOPS-applied time to be r, the area from which the present airplane can fly to the airport is calculated by the following equation:

$$E(x, y) = \{(x-x0)^2 + (y-y0)^2 \leq r^2$$

or $$(x-x1)^2+(y-y1)^2 \leq r^2$$

or . . .
or $$(x-xk)^2+(y-yk)^2 \leq r^2\} \quad (1)$$

At the next step of S6, the operating portion 11 decides whether a flight route entered at step S3 is contained in an area specified at step S5. If it is decided at this step that the flight route is contained within the flight-permitted area throughout the flight, the process procedure goes to step S8, where the display portion 14 displays an output content.

If it is decided at step S6 that the flight route is at least partially out of the flight-permitted area, the operating portion 11 makes a shift to step S7 to modify the flight route. This operation is described with reference to FIG. 5.

Figure 5:
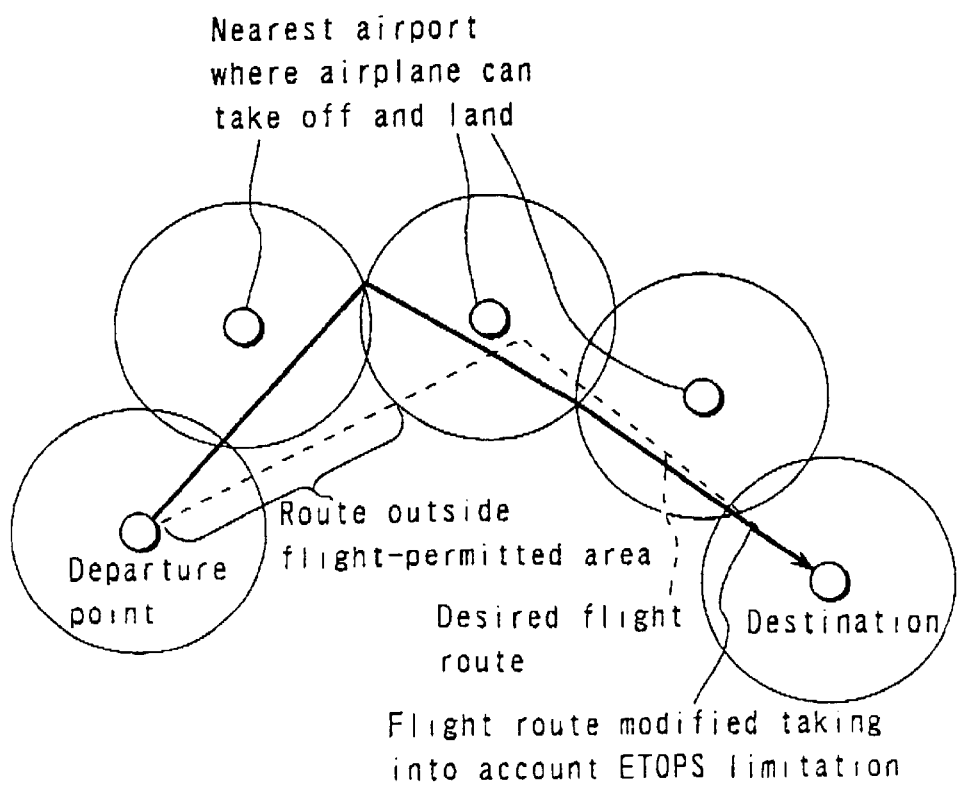
FIG. 5 is a schematic diagram for showing how to modify a flight route in the embodiment of the present invention.

FIG. 5 is a schematic diagram for showing how to modify the flight route in this embodiment. In FIG. 5, the inside of a circle has as its radius a distance over which the present plane can fly from the nearest airport where it can take off and land. As against this, a route drawn in a dotted line in the figure indicates a desired route of the present plane, part of which is shown to be out of the flight-permitted area. This flight route indicated by the dotted line is modified by the operating portion 11 into that of the solid line, so that the flight may be contained in the flight-permitted area, so as to match the desired route as much as possible. Thus, it is possible to automatically set a flight route taking ETOPS into account. Note here that in modification of the flight route, such a factor of minimizing the fuel consumption may be taken into account.

When a modified flight route is thus obtained, the process skips to step S8 to perform display processing. At this step, the contents displayed in FIG. 5 only need to be displayed as are, Thus, in this embodiment, the database portion 12 is adapted to store the data of the nearest airports where the present plane can take off and land as well as the data of the ETOPS-applied time so that this ETOPS-applied time can be read out when an FMS sets a flight route. Then, the inside of a circle having a radius r calculated from the thus read out ETOPS-applied time is defined to be a flight-permitted area, so that if a desired route entered by the operator is out of this area, the operating portion 11 calculates such a flight route that is contained within the flight-permitted area throughout its flight, which route is then displayed at the display portion 14.

Thus, it is possible to calculate a flight route taking into account an ETOPS-limitation on the flight area without manual operations, thus improving convenience for the operator as well as safety in operations.

Besides, by setting a modified route calculated by the operating portion 11 into an automatic pilot (not shown), a further energy saving is possible.

(Second Embodiment)

The following will describe a second embodiment of the present invention. As for the first embodiment, such processing has been described that modifies a desired route taking into account the ETOPS-limitation. Such processing is considered to be performed totally on the ground, before a flight. In contrast, as for this embodiment, such processing is described that sets the shortest route to a destination taking into account the ETOPS limitation. The processing referred to in this embodiment is totally performed when the route is modified in flight, In this embodiment, at step S3 in the flowchart of FIG. 3, instead of entering an operator's desired flight route, the shortest route connecting the current position's coordinates (x0, y0) given at step S2 and the destination's coordinates (xk, yk) is calculated, based on an input from the operator. That is, "Input desired flight route" is replaced by "Automatically set shortest route connecting departure point (or current position) and destination" at step S3 in the flowchart of FIG. 3.

Figure 6:
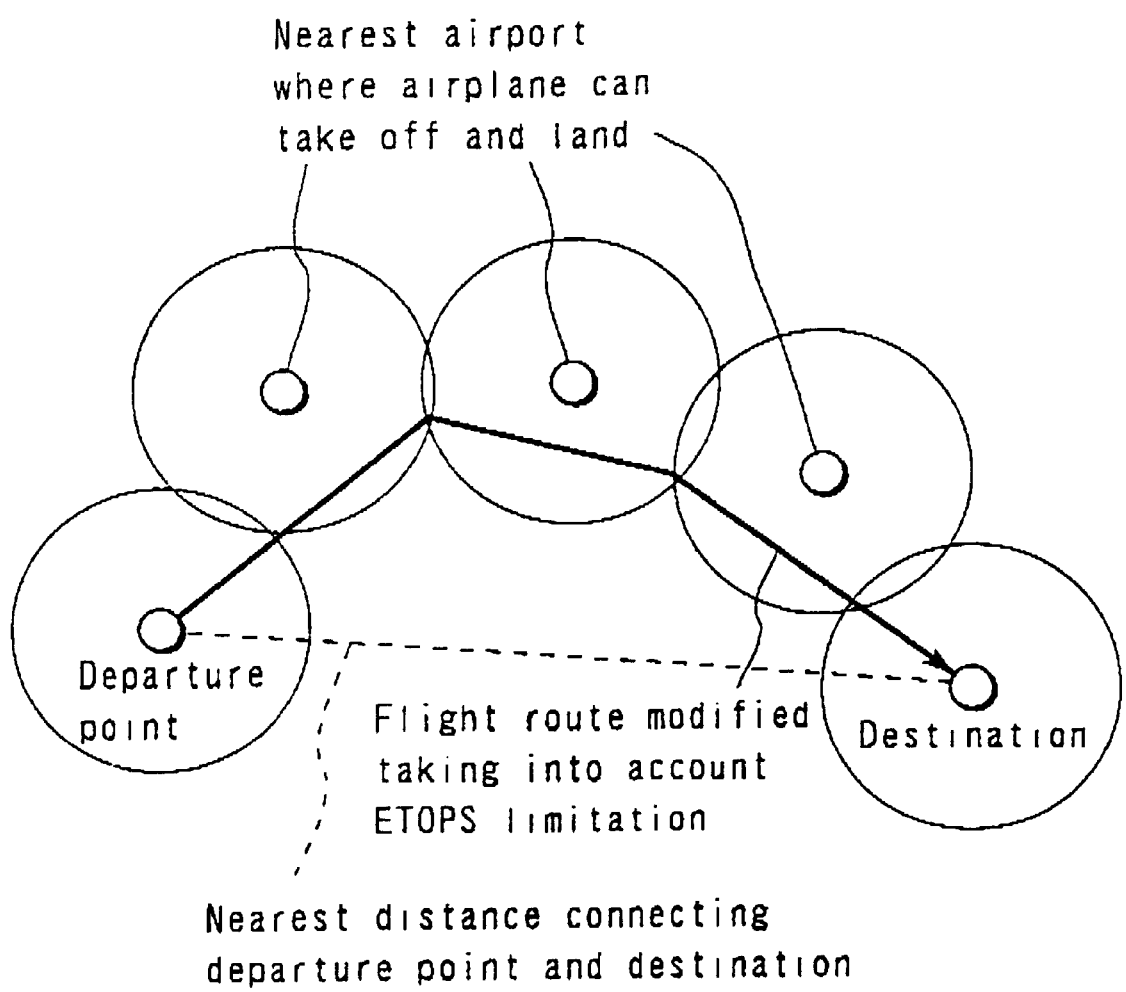
FIG. 6 is a schematic diagram for explaining an example of setting a route in a second embodiment of the present invention.

The following will describe an example of setting a route in this second embodiment with reference to FIG. 6. In FIG. 6, the shortest route connecting the departure point and the destination is indicated by a dotted line.

The operating portion 11 modifies the flight route taking into account a flight-permitted area due to the ETOPS limitation to work out by calculation a route indicated by a solid line. Then, the thus obtained route is displayed at the display portion 14 together with a symbol indicating the nearest airport where the present plane can take off and land. In short, the contents of FIG. 6 only need to be displayed at the display portion 14.

Thus, according to the second embodiment, it is possible to automatically set the shortest route connecting the departure point (or current position) and the destination taking into account the ETOPS limitation on the flight area.

Furthermore, according to the second embodiment, when the present plane must fly to a position different from the original destination preset before flight because of an accident, by re-entering the coordinates of the current position and those of a new destination, a flight route to the destination can be automatically set taking into account the ETOPS limitation, thus greatly mitigating the labor of the operator as compared to a prior art embodiment.

Furthermore, according to this embodiment, the nearest airport where the present plane can take off and land along an automatically set flight route is displayed at the display portion 14. Accordingly, the pilot can fly with the knowledge of airports where he can take off and land along his flight route at hand, thus further securing provision against an emergency due to engine trouble.

Thus, according to this embodiment, it is possible to provide a navigation assisting system and a flight route calculating method that can set a flight route taking into account the ETOPS limitation on the flight area.

(Third Embodiment)

The following will describe a third embodiment of the present invention. Even if it has to fly along a route different from its original flight plan because of an accident after take-off, a twin-engine airplane must take care not to leave the area designated by the ETOPS limitation. The following will describe an aspect that can mitigate the burden on the pilot of an airplane which has encountered such an accident.

Figure 7:
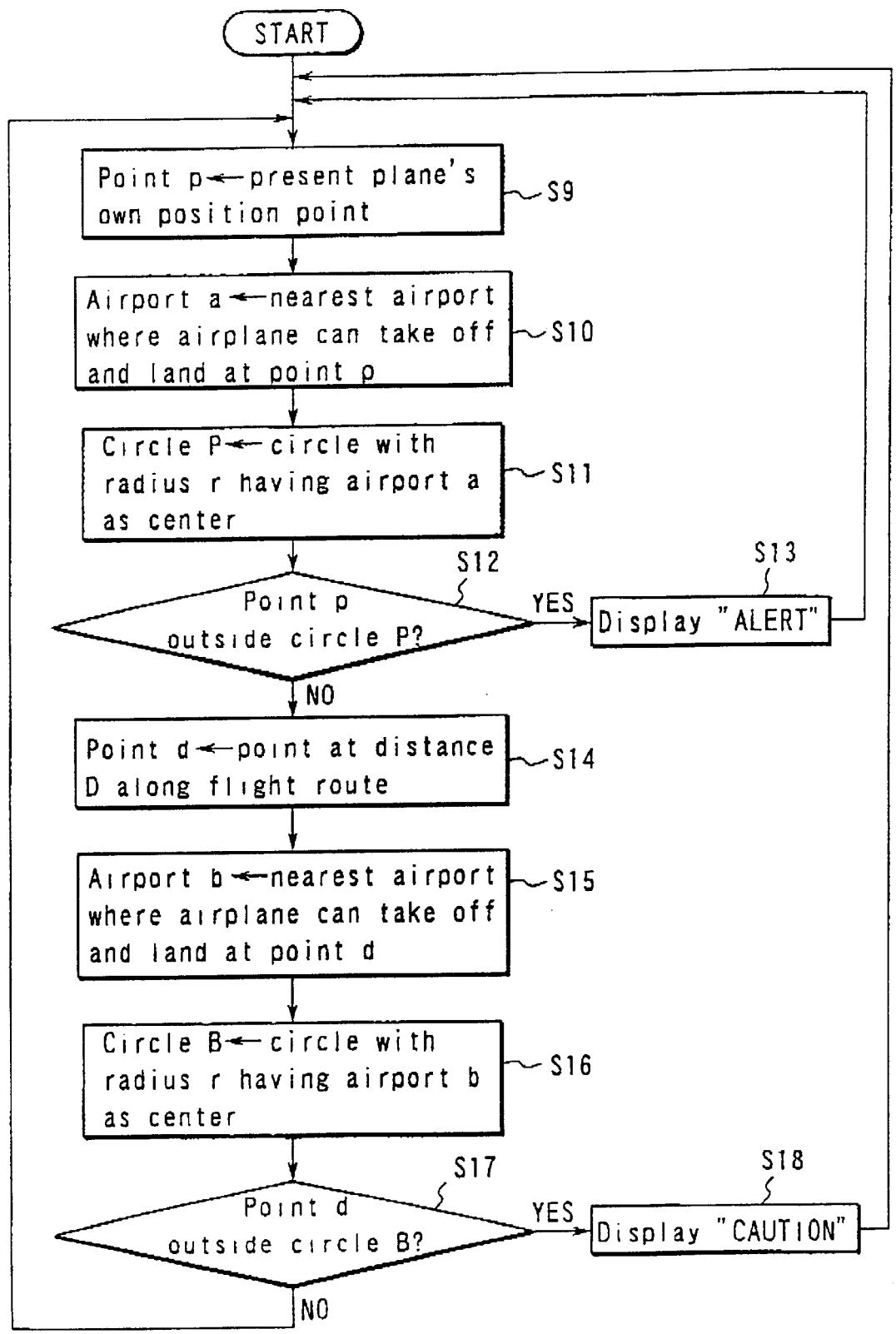
FIG. 7 is a flowchart for showing operations of a navigation assisting system according to a third embodiment of the present invention.

FIG. 7 is a flowchart for showing the operations of a navigation assisting system according to this embodiment. The operations shown by this flowchart are consecutively performed when the present plane is, for example, cruising. At step S9 of FIG. 7, the navigation assisting system obtains the position information of the present plane from, for example, an existing INS positioning system (not shown). This present planets own position point is supposed to be point p. At the next step of S10, the navigation assisting system searches the database 12 for the nearest airport (hereinafter called airport a)where the present plane can take off and land.

At the next step of S11, the navigation assisting system reads out an ETOPS-applied time of the present plane stored in the database portion 12 and works out, by operations, a circle (circle P) having airport a as its center and also having as its radius r a flight distance of the present plane corresponding to thus read out time. FIG. 8 is a schematic diagram for showing a flight-permitted area in which the present plane must exist. That is, circle P is defined to be a circle having airport a as its center and r as its radius.

At the next step of S12, the navigation assisting system decides whether point p indicating the position of the aircraft is outside circle P. In the case of NO, that is, if it is decided that point p is inside circle P, the process shifts to step S14.

At step S14, the navigation assisting system sets a decision point (hereinafter called point d) at a distance D in a traveling direction along a flight route of the present plane to calculate position coordinates of this point d. The distance D may be arbitrarily set according to requirements in system designing. At the next step of S15, the navigation assisting system searches the database portion 12 for the nearest airport (hereinafter called airport b) where the present plane can take off and land when it is present at point d.

At the next step of S16, the navigation assisting system uses an ETOPS-applied time of the present plane read out at step S11 to thereby work out, by operations, a circle (circle r) having its flight distance r corresponding to this time as its radius r and airport b as its center.

At the next step of S17, the navigation assisting system decides whether point d is outside circle B. In the case of NO, that is, if it is decided that point d is inside circle B, the navigation assisting system returns to step S9 to repeat processing of step S9 and the subsequent.

In the case of YES at step S12, that is, if it is decided that the present plane is currently outside the flight-permitted area already, the navigation assisting system makes a shift to step S13 to display "ALERT" on the display screen of the display portion 14, thus indicating a higher danger degree of warning message.

Suppose here YES at step S17, that is, it is decided that point d is outside circle B. This means that currently the present plane is not outside the flight-permitted area but may leave it if it continues its flying in the same direction. If it decides so, the navigation assisting system makes a shift to step S18 to display "CAUTION" on the display screen of the display portion 14, thus indicating a moderate degree of danger. The calculation processing in the above-mentioned flowchart is mainly executed by the software at the operating portion 11.

The following will describe how to generate warning by this embodiment with respect to the schematic diagrams of FIGS. 9A and 9B. FIG. 9A shows a case where no warning message (ALERT) is generated at step S18, in which point d is outside the flight-permitted area to which the present plane is currently in, but inside a flight-permitted area of airport b. That is, even if the present plane continues its course, it cannot leave the ETOPS-applied flight-permitted area, and no warning is generated.

FIG. 9B, on the other hand, indicates a case where a warning message is generated at step S18. As is clear from the figure, point d belongs neither to circle P nor to circle B, so that if the present plane continues its course, it may leave the ETOPS-applied flight-permitted area. Accordingly, the navigation assisting system generates an alert at step S18.

On the display screen of the display portion 14, preferably not only the warning message but also the schematic diagrams of FIGS. 9A and 9B are displayed graphically. that is, for example, a triangular symbol is displayed at the coordinates on the screen corresponding to the present plane's own position and the airport in its vicinity is indicated by, for example, an elliptical symbol. Further, the ETOPS-applied flight-permitted area is indicated by a circle.

Thus, according to this embodiment, the database 12 is adapted to store the data of the nearest airports where the present plane can take off and land as well as the data of the ETOPS-applied time related to the present plane so that this ETOPS-applied time can be read out in, for example, the cruise mode. An area having a radius r calculated from this ETOPS-applied time is defined to be a flight-permitted area of the present plane so that the operating portion 11 can decide, by calculations, whether the present plane is outside this area. If it is decided that the present plane is outside the flight-permitted area as a result of monitoring, it displays "ALERT" at the display portion 14. If is decided that, on the present course, it will leave it, even if still inside, it displays "CAUTION" at the display portion 14.

That is, according to this embodiment, it is decided whether the present plane is outside the ETOPS-applied flight-permitted area, and if so, issues a warning to the pilot. Thus, by this embodiment, it is possible to post an alert taking into account the ETOPS limitation, thus providing a navigation assisting system and method that can further improve safety in operations.

The present invention is not limited to the above-mentioned embodiments. For example, at the display processing at steps S13 and S18, besides display of the characters ("CAUTION", "ALERT", etc.) to the effect of warning on the display screen, warning messages may be posted in a variety of ways. For example, the color of the background of the display screen may be changed into yellow or red corresponding to the warning level of "CAUTION" and "ALERT" or the color of the flight-permitted area to which the present plane itself belongs may be changed.

Figure 10:
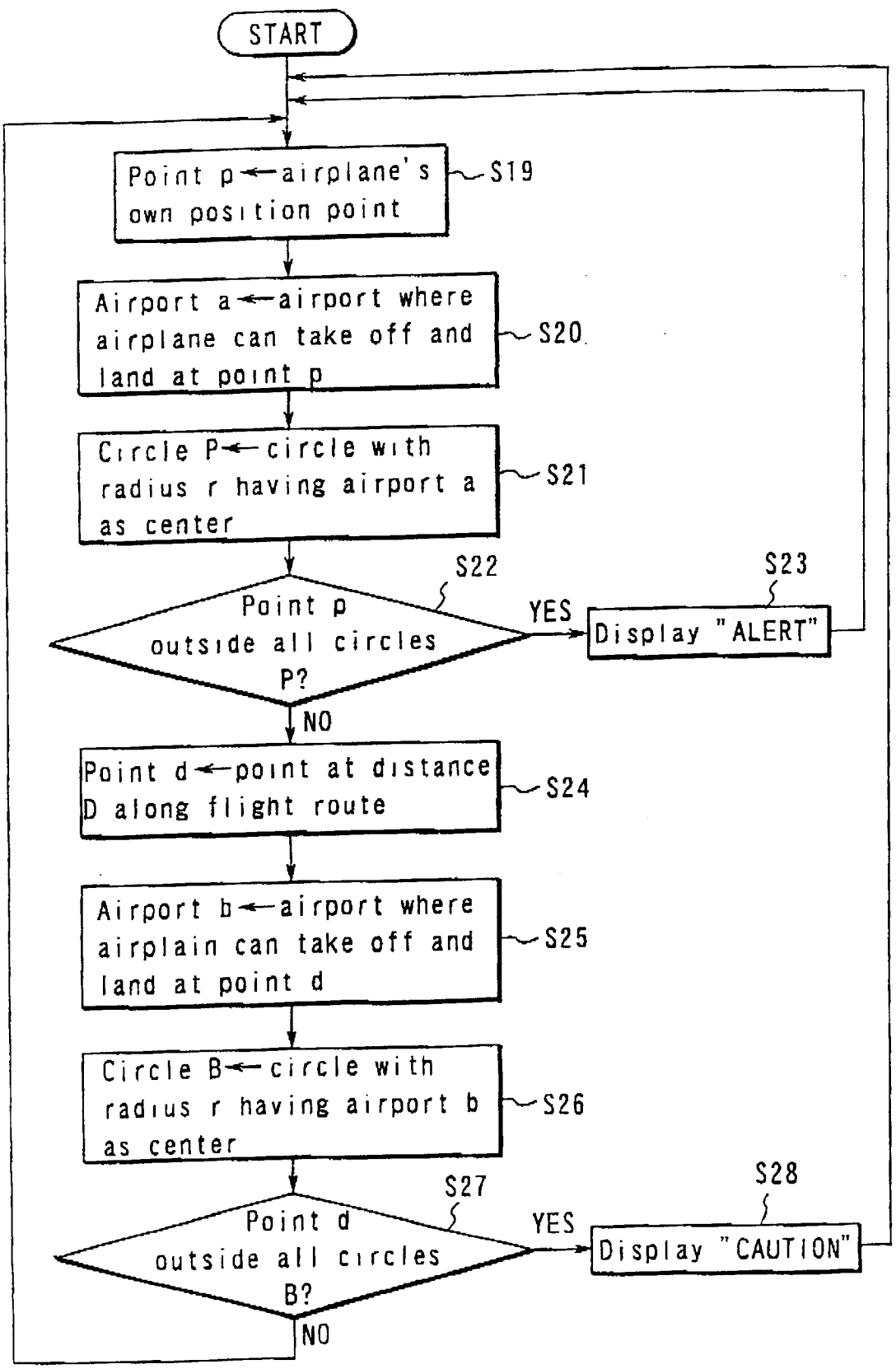
FIG. 10 is a flowchart for showing operations of the navigation assisting system of the third embodiment of the present invention.

Furthermore, in the third embodiment, at step S10 or S15, the nearest airport where the present plane can take off and land is searched for. Different processing may be performed instead, FIG. 10 is a flowchart for showing operations of a navigation assisting system related to a variant of the third embodiment of the present invention. In FIG. 10, at steps S20 and S25, an airport where the present plane can take off and land is searched for. At step S22, it is decided whether point p is inside at least one circle P. At step S26, on the other hand, it is decided whether point d is inside at least one circle B. That is, if point p is outside all circles P or if point d is outside all circles B, it may be decided that the flight route of the aircraft is outside the permitted area.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A navigation assisting system carried and used on an airplane, comprising:

memory means for storing a database in which position information of a plurality of airports and information of permission/refusal of take-off/landing of said airplane at said airports correspond to said plurality of airports, respectively, and a regulated time set for said airplane; and operating means for specifying as a flight-permitted area of said airplane the inside of a circle having as a radius thereof a distance over which said airplane can arrive within said regulated time and also having as a center thereof an airport where said airplane can take off and land, and then calculating a flight route of said airplane in said flight-permitted area.

2. The navigation assisting system according to claim 1, further comprising input means for inputting a desired flight route,
wherein said operating means calculates a new flight route in said flight-permitted area if said desired flight route input is outside said flight-permitted area.

3. The navigation assisting system according to claim 1, further comprising input means for inputting position information of a current position of said airplane and position information of a destination of said airplane,
wherein said operating means calculates the shortest flight route connecting said current position and said destination within said flight-permitted area.

4. The navigation assisting system according to claim 1, further comprising display means for displaying thereon a flight route calculated by said operating means.

5. The navigation assisting system according to claim 4, wherein said display means displays position information of an airport where said airplane can take off and land in a flight area to which said airplane can reach from said flight route.

6. The navigation assisting system according to claim 5, wherein said display means displays a flight area to which said airplane can reach from said flight route.

7. A navigation assisting system carried and used on an airplane, comprising:
memory means for storing a database in which position information of a plurality of airports and information of permission/refusal of take-off/landing of said airplane at said airports correspond to said plurality of airports, respectively, and a regulated time set for said airplane; and
operating means for specifying as a flight-permitted area of said airplane the inside of a circle having as a radius thereof a distance over which said airplane can arrive within said regulated time and also having as a center thereof an airport where said airplane can take off and land, and then searching said database for the nearest airport where said airplane can take off and land, to decide whether said airplane is outside said flight-permitted area, based on a relative positional relationship between said airplane and said flight-permitted area for said nearest airport.

8. The navigation assisting system according to claim 7, comprising display means for displaying a message if said operating means decides that said airplane is outside said flight-permitted area.

9. A navigation assisting system carried and used on an airplane, comprising:
memory means for storing a database in which position information of a plurality of airports and information of permission/refusal of take-off/landing of said airplane at said airports correspond to said plurality of airports, respectively, and a regulated time set for said airplane; and
operating means for specifying as a flight-permitted area of said airplane the inside of a circle having as a radius thereof a distance over which said airplane can arrive within said regulated time and also having as a center thereof an airport where said airplane can take off and land, to decide whether said airplane is outside said flight-permitted area, based on a relative positional relationship between said airplane and said flight-permitted area.

10. The navigation assisting system according to claim 9, wherein said operating means decides that said airplane is outside said flight-permitted area if a position of said airplane is outside all of said flight-permitted areas.

11. A navigation assisting system carried and used on an airplane, comprising;
memory means for storing a database in which position information of a plurality of airports and information of permission/refusal of take-off/landing of said airplane at said airports correspond to said plurality of airports, respectively, and a regulated time set for said airplane; and
operating means for specifying as a flight-permitted area of said airplane the inside of a circle having as a radius thereof a distance over which said airplane can arrive within said regulated time and also having as a center thereof an airport where said airplane can take off and land, and then setting a decision point at a predetermined distance in a traveling direction of said airplane, to decide whether said decision point is outside said flight-permitted area, based on a relative positional relationship between said decision point and said flight-permitted area.

12. The navigation assisting system according to claim 9, wherein said operating means decides that said decision point is outside said flight-permitted area if a position of said decision point is outside all of said flight-permitted areas.

13. A navigation assisting system carried and used on an airplane, comprising:
memory means for storing a database in which position information of a plurality of airports and information of permission/refusal of take-off/landing of said airplane at said airports correspond to said plurality of airports, respectively, and a regulated time set for said airplane; and
operating means for specifying as a flight-permitted area of said airplane the inside of a circle having as a radius thereof a distance over which said airplane can arrive within said regulated time and also having as a center thereof an airport where said airplane can take off and land, and then setting a decision point at a predetermined distance in a traveling direction of said airplane, to decide whether at least one of said airplane and said decision point is outside said flight-permitted area, based on a relative positional relationship between said decision point and said flight-permitted area.

14. The navigation assisting system according to claim 10, comprising display means for displaying different messages for a case where said operating means decides that a position of said airplane is outside said flight-permitted area and a case where said operating means decides that only said decision point is outside said flight-permitted area.

15. A flight-route calculating method by use of a navigation assisting system carried and used on an airplane, comprising:
a first step of inputting a desired flight route of said airplane;
a second step of specifying a flight-permitted area to which said airplane can reach an airport where said airplane can take off and land within a regulated time set for said airplane; and
a third step of calculating a new flight route within said flight-permitted area if said desired flight route is outside a flight-permitted area specified at said second step.

16. The flight-route calculating method according to claim 15, wherein said second step specifies as said flight-permitted area the inside of a circle having as a center thereof an airport where said airplane can take off and land and having as a radius thereof a distance over which said airplane can fly within said regulated time.

17. A flight-route calculating method by use of a navigation assisting system carried and used on an airplane, comprising:
- a first step of inputting position information of a current position of said airplane and position information of a destination of said airplane;
- second step of specifying a flight-permitted area to which said airplane can reach an airport where said airplane can take off and land within a regulated time set for said airplane; and
- a third step of calculating the shortest flight route connecting said current position and said destination within a flight-permitted area specified by said second step.

18. A navigation assisting method by use of a navigation assisting system carried and used on an airplane, comprising:
- a first step of searching for an airport where said airplane can take off and land;
- a second step of calculating as a flight-permitted area of said airplane the inside of a circle having as a center thereof said nearest airport searched for at said first step and having as a radius thereof a distance over which said airplane can fly within a regulated time set for said airplane; and
- a third step of comparing said airplane and a flight-permitted area calculated at said second step in terms of relative positional relationship to thereby decide whether said airplane is outside said flight-permitted area.

19. The navigation assisting method according to claim 18, further comprising:
- a fourth step of displaying a message if said third step decides that said airplane is outside said flight-permitted area.

20. A navigation assisting method by use of a navigation assisting system carried and used on an airplane, comprising:
- a first step of calculating as a flight-permitted area of said airplane the inside of a circle having as a center thereof an airport where said airplane can take off and land and having as a radius thereof a distance over which said airplane can fly within a regulated time set for said airplane; and
- a second step of comparing said airplane and a flight-permitted area calculated at said first step in terms of relative positional relationship to thereby decide whether said airplane is outside said flight-permitted area.

21. The navigation assisting method according to claim 20, wherein said second step decides that said airplane is outside said flight-permitted area if a position of said airplane is outside all of said flight-permitted areas.

22. The navigation assisting method according to claim 20, further comprising;
- a third step of displaying a message if said second step decides that said airplane is outside said flight-permitted area.

23. A navigation assisting method by use of a navigation assisting system carried and used on an airplane, comprising;
- a first step of calculating as a flight-permitted area of said airplane the inside of a circle having as a center thereof an airport where said airplane can take off and land and having as a radius thereof a distance over which said airplane can fly within a regulated time set for said airplane; and
- a second step of comparing a decision point set at a predetermined distance in a traveling direction of said airplane and a flight-permitted area calculated at said first step in terms of a relative positional relationship to thereby decide whether said decision point is outside said flight-permitted area.

24. The navigation assisting method according to claim 23, wherein said second step decides that said decision point is outside said flight-permitted area if a position of said decision point is outside all of said flight-permitted areas.

25. The navigation assisting method according to claim 23, further comprising;
- a third step of displaying different messages for a case where said second step decides that a position of said airplane is outside said flight-permitted area and a case where said second step decides that only said point is outside said flight-permitted area.

26. A navigation assisting method by use of a navigation assisting system carried and used on an airplane, comprising:
- a first step of calculating as a flight-permitted area of said airplane the inside of a circle having as a center thereof an airport where said airplane can take off and land and having as a radius thereof a distance over which said airplane can fly within a regulated time set for said airplane; and
- a second step of comparing a decision point set at a predetermined distance in a traveling direction of said airplane and a flight-permitted area calculated at said first step in terms of a relative positional relationship to thereby decide whether at least one of said airplane and said decision point is outside said flight-permitted area.

* * * * *